US012809338B2

(12) United States Patent
Dolgovykh et al.

(10) Patent No.: US 12,809,338 B2
(45) Date of Patent: Nov. 24, 2026

(54) SYSTEM AND METHOD FOR MANAGING AUTOMATION SYSTEMS WITH SYNCHRONOUS ELEMENTS USING AN IMPROVED COMMUNICATIONS PROTOCOL

(71) Applicant: ATS CORPORATION, Cambridge (CA)

(72) Inventors: Anton Dolgovykh, Cambridge (CA); Noah Zwiep, Cambridge (CA)

(73) Assignee: ATS Corporation

( * ) Notice: Subject to any disclaimer, the term of this patent is extended or adjusted under 35 U.S.C. 154(b) by 533 days.

(21) Appl. No.: 17/991,934

(22) Filed: Nov. 22, 2022

(65) Prior Publication Data

US 2023/0161328 A1 May 25, 2023

Related U.S. Application Data

(60) Provisional application No. 63/281,977, filed on Nov. 22, 2021.

(51) Int. Cl.

*G05B 19/4155* (2006.01)
*B65G 43/08* (2006.01)
*B65G 47/26* (2006.01)

(52) U.S. Cl.

CPC ......... *G05B 19/4155* (2013.01); *B65G 43/08* (2013.01); *B65G 47/26* (2013.01);
(Continued)

(58) Field of Classification Search

CPC ...... G05B 19/4155; G05B 2219/31368; G05B 2219/31174; G05B 19/4185; B65G 43/08;
(Continued)

(56) References Cited

U.S. PATENT DOCUMENTS 12,403,604 B2 * 9/2025 Fujino .................... B25J 9/1664
2003/0191544 A1 10/2003 Faulhammer et al.
(Continued)

FOREIGN PATENT DOCUMENTS

EP 3876044 A1 9/2021

OTHER PUBLICATIONS

Cavalaglio, J. "A new method for motion synchronization among multivendors programmable controllers", May 2018, retrieved online URL :<https://www.sciencedirect.com/science/article/pii/S0263224118304408> (Year: 2018).*
(Continued)

*Primary Examiner* — Jonathan Michael Skrzycki
(74) *Attorney, Agent, or Firm* — Gowling WLG (Canada) LLP

(57) ABSTRACT

A method for managing an automation system involving a plurality of synchronous elements, the method including: designating a master signal for controlling the plurality of synchronous elements; determining a communication protocol for communicating the master signal to the plurality of synchronous elements; determining a compensation profile for each of the plurality of synchronous elements based on the communication protocol and characteristics of each of the plurality of synchronous elements; and utilizing the compensation profile in the control of the automation system. A system for managing an automation system involving at least two synchronous elements, the system including: a first controller for controlling a first synchronous element; a second controller for controlling at least a second synchronous element; a configuration module for configuring at least the second synchronous element; a memory storing instructions that, when executed by the second controller, cause the second controller to perform the method above.

17 Claims, 19 Drawing Sheets

(52) U.S. Cl.
CPC ................ *B65G 2203/0233* (2013.01); *B65G 2203/025* (2013.01); *G05B 2219/31368* (2013.01)

(58) Field of Classification Search
CPC ............ B65G 47/26; B65G 2203/0233; B65G 2203/025
See application file for complete search history.

(56) References Cited

U.S. PATENT DOCUMENTS

| | | | | |
|---|---|---|---|---|
| 2006/0271805 | A1 * | 11/2006 | Pearce | H04L 12/423 713/401 |
| 2007/0143510 | A1 * | 6/2007 | Schultze | H04L 12/423 710/100 |
| 2009/0016475 | A1 * | 1/2009 | Rischar | H04J 3/0697 375/356 |
| 2009/0160504 | A1 * | 6/2009 | Morrison | G05B 19/414 327/141 |
| 2011/0137434 | A1 | 6/2011 | Chang et al. | |
| 2017/0090464 | A1 * | 3/2017 | Horiguchi | G05B 19/4141 |
| 2017/0229991 | A1 * | 8/2017 | Huber | G05B 7/02 |
| 2022/0128977 | A1 * | 4/2022 | Kumar | H04L 69/18 |

OTHER PUBLICATIONS

Tu, T. "Method for increasing accuracy of synchronous control by compensating for network latency", 2014, retrieved online URL :<https://ieeexplore.ieee.org/document/7018568> (Year: 2014).*

Cavalaglio Camargo Molano Jacopo et al., "A new method for motion synchronization among multivendor's programmable controllers", Measurement, Institute of Measurement and Control, vol. 126, pp. 202-214. dated May 12, 2018.

Extended European Search Report, European Patent Office, corresponding Europe Application No. 22208922.9, dated Apr. 5, 2023.

Extended European Search Report, European Patent Office, corresponding Europe Application No. 22208923.7, dated Apr. 4, 2023.

* cited by examiner

| Bit | Meaning | Description |
|---|---|---|
| 0 | Use Jerk | Set this bit to enable using jerk for external master control. Requires valid jerk input |
| 1 | Enable Jerk input processing | Enable to allow software processing of jerk input when accelerating/decelerating. This is used when the input can only produce jerk of a single sign (+ve for accel and -ve for decel). |
| 2 | Enable Commanded Acceleration input processing | Similar to Jerk input processing, enable this if the commanded acceleration signal does not properly get set to 0 when 'concluding' accelerations or decelerations. Instead of being set to XYZ then 0 it is set to XYZ then -XYZ when concluding acceleration or deceleration operations. |
| 3-7 | Reserved for future use | |

Individual ExternalMaster Control:

| Byte | Contents |
|---|---|
| 0-3 | Setpoint Position (uDeg) |
| 4-7 | Setpoint Velocity (mDeg / s) |
| 8-11 | Setpoint Acceleration (mDeg / $s^2$) |
| 12-15 | Setpoint Jerk (mDeg / $s^3$) |
| 16-19 | Commanded Velocity (mDeg / s) |
| 20-23 | Commanded Acceleration (mDeg / $s^2$) |

FIG. 9

Common ExternalMaster Control:

| Byte | Contents |
|---|---|
| 0-3 | Time Stamp Echo (us) |
| 4 | External Master Common Control Bits |
| 5-7 | Reserved for future use |

Common ExternalMaster Status:

| Byte | Contents |
|---|---|
| 0-3 | Time Stamp Echo (us) |
| 5-7 | Time Stamp Difference (us) |

Individual ExternalMaster Status:

| Byte | Contents |
|---|---|
| 0 | ExternalMaster Status Bits |

ExternalMaster Status Bit definitions:

| Bit | Meaning | Description |
|---|---|---|
| 0 | SyncZone Stop Requested | Indicates that the Synczone is being stopped/is stopped for internal reasons. |
| 1-7 | Reserved for future use | |

FIG. 10

SYSTEM AND METHOD FOR MANAGING AUTOMATION SYSTEMS WITH SYNCHRONOUS ELEMENTS USING AN IMPROVED COMMUNICATIONS PROTOCOL

RELATED APPLICATION

The present disclosure claims priority to U.S. Provisional Pat. App. No. 63/281,977, filed Nov. 22, 2021, which is hereby incorporated herein by reference.

FIELD

The present disclosure relates generally to a system and method for managing automation systems and equipment. More particularly, the present, disclosure relates to a system and method for managing automation systems with synchronous elements from a variety of manufacturers.

BACKGROUND

Modern manufacturing and automation systems and processes are becoming more complex, at least in part because these systems and processes are required to be fast, accurate and repeatable over longer periods of time. These systems and processes are expected to provide appropriate product quality in short time frames. These systems and processes also seek to provide high machine efficiency with low downtime for maintenance, trouble-shooting and the like.

Since manufacturing and automation systems have complex requirements there can be situations where products from differing manufacturers need to be implemented into a single automation system. Further, in order to get higher levels of efficiency, it can be necessary to co-ordinate the activities (e.g. motion profiles) of various different types of automation systems from various manufacturers. However, generally speaking, automation systems manufacturers may try to limit the ability to interchange hardware so that a buyer will only use a particular manufacturers hardware. One way in which the ability to interchange hardware is the use of different communication protocols. While there are some known solutions that attempt to convert between different communication protocols by using industrial computers or the like, in practice this process can be very complex and needs to be updated regularly. In a situation where there needs to be co-ordination between or among hardware, the complexity is even higher due to the need for real-time or near real-time communication and the latency that can exist in the process of conversion or in the communication protocol itself.

As such, there is a need for improved system and method for managing automation systems and equipment in manufacturing environments.

SUMMARY

According to an aspect herein, there is provided a method for managing an automation system involving synchronous elements, the method including: determining a master signal for controlling a plurality of synchronous elements; determining a communication protocol for communicating the master signal to the plurality of synchronous elements; determining a lag time for the master signal to reach the synchronous elements related to the communication protocol and characteristics of the synchronous elements; and implementing the determined lag time into the control of the automation system.

According to another aspect herein, there is provided a method for managing an automation system involving synchronous elements, the method including: sending a master signal for controlling a plurality of synchronous elements; if necessary, inserting a lag time between the master signal and at least one of the synchronous elements, wherein the lag time is related to characteristics of the communication protocol and the data being sent as well as characteristics of the synchronous elements; and synchronizing at least one of the synchronous elements to the master signal using a compensation algorithm based on setpoint position, velocity, acceleration and jerk as well as commanded velocity and commanded acceleration.

In some cases, the compensation algorithm may include using reactively calculated compensations and pre-determining setpoints based on the commanded velocity and commanded acceleration. In this way, it is less likely that the movement will lag behind the input during the period when waiting for updated data for, for example, setpoints.

According to another aspect herein, there is provided a method for managing an automation system involving a plurality of synchronous elements, the method including: designating a master signal for controlling the plurality of synchronous elements; determining a communication protocol for communicating the master signal to the plurality of synchronous elements; determining a compensation profile for each of the plurality of synchronous elements based on the communication protocol and characteristics of each of the plurality of synchronous elements; and utilizing the compensation profile in the control of the automation system.

In some cases, the compensation profile may include a lag time between the sending of the master signal and the receipt of the master signal at each synchronous element.

In some cases, the compensation profile may also be based on characteristics of the data being sent.

In some cases, the compensation profile may include compensation based on at least one of commanded position, commanded velocity, and commanded acceleration.

In some cases, the compensation profile may include compensation for jerk.

In some cases, the compensation profile may include predetermined compensation graphs to reduce computation time and complexity.

According to another aspect herein, there is provided a system for managing an automation system involving at least two synchronous elements, the system including: a first controller for controlling a first of the synchronous elements; a second controller for controlling at least a second of the synchronous elements; a configuration module for configuring at least the second synchronous element; a memory storing instructions that, when executed by the second controller, cause the second controller to: designate the first controller as a master signal for controlling the plurality of synchronous elements; determine a communication protocol for communicating the master signal to the plurality of synchronous elements; determine a compensation profile for each of the at least two synchronous elements based on the communication protocol and characteristics of each of the plurality of synchronous elements; and utilize the compensation profile in the control of the automation system.

In some cases, the compensation profile may include a lag time between the sending of the master signal and the receipt of the master signal at each synchronous element.

In some cases, the compensation profile is also based on characteristics of the data being sent.

In some cases, the compensation profile may include compensation based on at least one of commanded position, commanded velocity, and commanded acceleration.

In some cases, the compensation profile may include compensation for jerk.

In some cases, the compensation profile may include predetermined compensation graphs to reduce computation time and complexity.

In some cases, the configuration module may provide data to the second controller regarding communication protocols and compensation profiles.

Other aspects and features of the embodiments of the system and method will become apparent to those ordinarily skilled in the art upon review of the following description of specific embodiments in conjunction with the accompanying figures.

BRIEF DESCRIPTION OF THE FIGURES

Embodiments of the system and method will now be described, by way of example only, with reference to the attached Figures, wherein:

FIGS. 9/10 are tables showing example master control information/data flowing from a PLC over a communication network;

DETAILED DESCRIPTION

Figure 1:
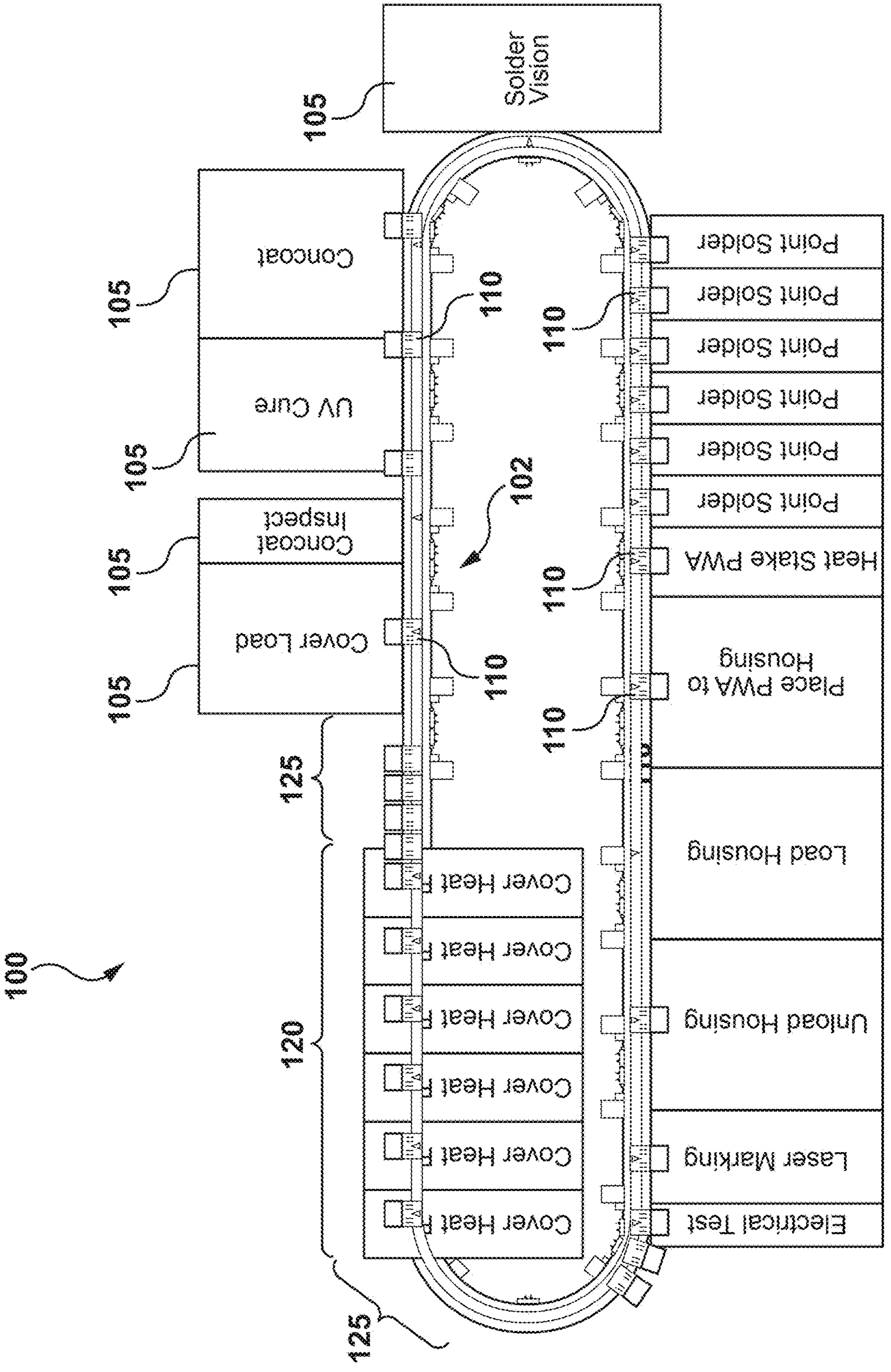
FIG. 1 is a diagram illustrating an example of an automation system including a conveyor system and various automation stations.

The following description, with reference to the accompanying drawings, is provided to assist in understanding the example embodiments. The following description includes various specific details to assist in that understanding but these are to be regarded as merely examples. Accordingly, those of ordinary skill in the art will recognize that the various embodiments described herein and changes and modifications thereto, including the use of elements of one embodiment with elements of another embodiment, can be made without departing from the scope and spirit of the appended claims and their equivalents. In addition, descriptions of well-known functions and constructions may be omitted for clarity and conciseness.

The terms and words used in the following description and claims are not limited to their bibliographical meanings but are meant to be interpreted in context and used to enable a clear and consistent understanding.

Generally, the present document provides for a system and method for managing automation systems. Embodiments of the system and method herein are intended to allow for integration of various manufacturer's products and synchronization of various manufacturer's products by compensating for network delay and variability between the manufacturer's products along with the designation/setup of the master controller (for example, a programmable logic controller (PLC)), which can provide the master signal to which other controllers can be synchronized. Embodiments of the system and method herein enable the use of different vendors' PLCs, drives and servos (for example, Siemens™, Omron™ and Rockwell™) as a source or master signal to drive operation of a conveyor in a synchronized way, without any significant performance loss for most machine applications.

While the concepts herein can be applied in various environments, the following description will focus on the use of automation stations/equipment together with a linear motor conveyor. Conveyors in an automation environment will typically have a plurality of automation stations placed along the conveyor and will have a variety of parameters/settings and the like that generally need to be configured properly in order for the conveyor and related automation stations to properly function together.

Automation stations are used on manufacturing or production lines to handle manufacturing operations and are typically arranged adjacent to a conveyor system for feeding parts or the like. An automation station may include a single piece of equipment/machine in a production line, such as a press, pick & place device or the like, but may also include a complex system involving robots, manipulators, and the like. Further, the automation station may be positioned to receive, via a conveyor, a moving element of the conveyor system, which may include at least one carrier/pallet per moving element configured to move a part into and/or out of an automation station. Generally speaking, automation stations/equipment have been difficult to manage, particularly in relation to interactions with conveyors, due to the complexity of interactions that can be required, differing communications protocols, and the like.

Conventional systems for the management of automation systems and assembly lines generally have difficulty integrating automation equipment from differing vendors with each other or with conveyor systems, including linear motor conveyor systems. Many parameters are required to be considered during automation operations together with a conveyor system, including, for example, parameters such as spacing, timing, trajectory, temperature, collision avoidance and the like.

FIG. 1 shows an example configuration of an automation system 100, including a conveyor system 102 and at least one automation station 110. In this case, the conveyor system 102 is a linear motor conveyor system including a track providing a linear motor that drives moving elements along the track using magnetic fields. At least one automation station, or automation element, 105 (which in the current example includes 23 automation stations 105) may be or include, for example, machines, sensors, servos, devices, or equipment, or a combination of machines, devices, or equipment, or the like. Each automation station 105 may require a certain amount of processing time and may further include various parameters related to their operation. As can be seen from FIG. 1, various types of automation stations may be needed and these automation stations may come from a variety of manufacturers.

Figure 4:
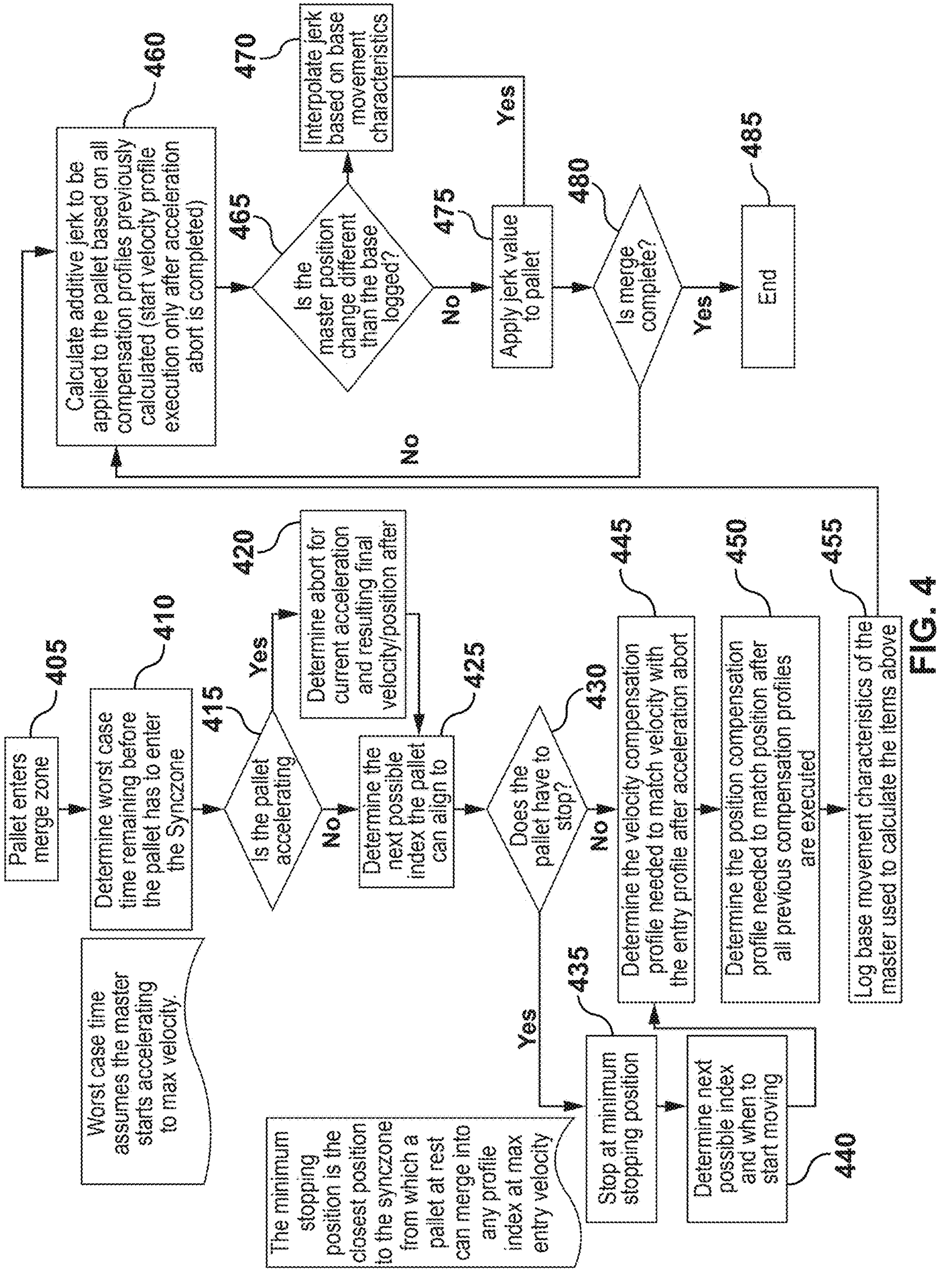
FIG. 4 is a flow chart for another method for managing automation systems according to an embodiment.
Figure 8:
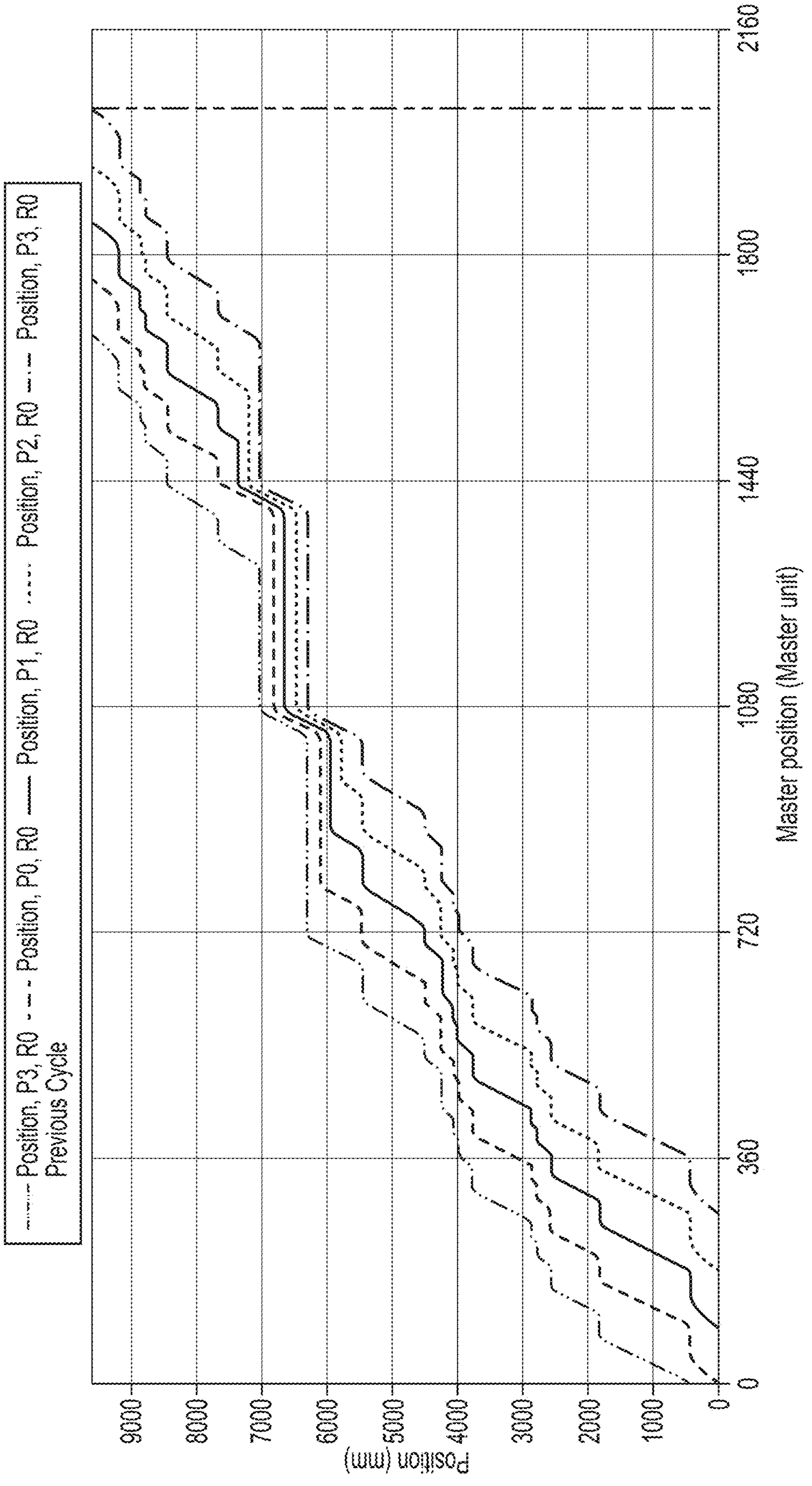
FIG. 8 illustrates an example predefined motion profile that moving elements would follow on a conveyor in relation to a master controller.

The conveyor 102 includes moving elements 110 that are configured to travel on the conveyor 102, stopping at one or more target set points ("targets") that relate to various automation stations 105 in order to have the automation station function applied to an item or object ("part or product") being carried by the moving element 110. In some cases, there may further be loading or unloading stations where the products or items are placed on or removed from the moving elements. Some of the automation stations 105 will operate in an asynchronous mode or be in an asynchronous area, in which, a moving element 110 will stop at an automation station 105 and the station will operate on a part on the moving element or the like. Generally, in an asynchronous mode, the conveyor system and automation stations 105 can accommodate variable cycle times and loading. However, in some areas, the conveyor system 102 and automation stations 105 may operate in a synchronization mode or synchronization area (indicated as synchronization area 120), in order to achieve higher speed throughput for automation stations that may be controlled by software or mechanical methods to work synchronously. For example, the automation station may be cammed either mechanically or via software—to repeat an action in a predefined manner continuously. These synchronous automation stations would generally have fixed cycle times, which allows for synchronization, for example, by following a master signal (which may be a software signal or the like as described in further detail in the description of FIG. 2). Similarly, moving elements 110 could be configured to follow a predefined motion profile (for example, such as that illustrated in FIG. 8), within the synchronous area 120, based on the master signal. In automation systems 100 where not all automation stations 105 are synchronized in some way, transitioning between an asynchronous area and a synchronous area 120 can sometimes require a merging zone 125. The merging zone 125 can be used to adjust/align/synchronize a moving element 110 to the software master signal so that the moving element can begin a motion profile sequence (example shown in FIG. 8) at the appropriate timing for entering the synchronous area 120. FIG. 4 and related description outlines an embodiment of a process for handling/managing of this merging zone. In order for the conveyor system 100 to work well with the various automation stations, various configuration parameters must be managed such that the moving elements will work in synchronization with the operations of the one or more automation stations. This synchronization must generally be accomplished at high speed and over a large number of cycles in order to provide a high throughput while reducing any bottlenecks. Further, the moving elements 110 are intended to move from position to position without colliding and ensuring, proper orientation for processing at, each automation station.

Figure 2:
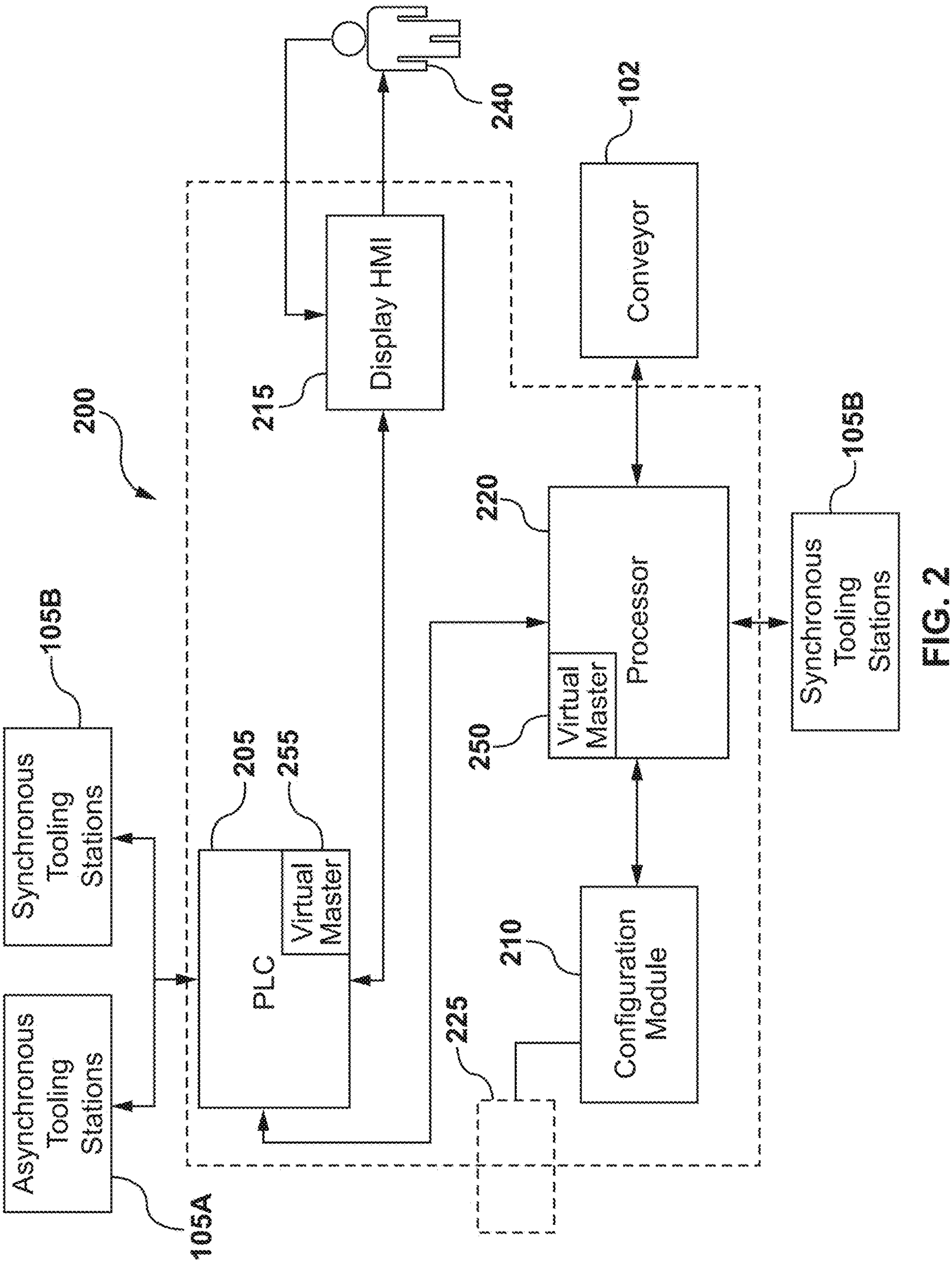
FIG. 2 is a block diagram illustrating an embodiment of a system for managing automation systems according to an embodiment.

FIG. 2 illustrates a system 200 for managing automation systems according to an embodiment. As noted above, the automation system 100 that is managed by the system 200 may include a conveyor 102 and a plurality of automation stations 105 and, further, the automation stations 105 may be in asynchronous areas/zones (automation stations 105A) or synchronous areas/zones (automation stations 105B). The system 200 includes one or more programmable logic controllers (PLC) 205 (which are typically associated with an automation station and control the elements of the automation station), a configuration module 210, a display/interface 215, and at least one processor 220. The configuration module 210 may include a connection to an internal or external data source, such as a database 225 or the like.

The PLC 210 and the processor 220 can be configured to allow input of and/or receive data related to various parameters related to the automation system. For example, there may be a display/interface (human machine interface (HMI)) 215 for a user 240 to input data related to the automation system, including the conveyor and the automation stations. In some cases, there may be access to one or more outside data sources 225, via, for example the configuration module 210, for data from third party data sources, for automation station/equipment parameters and the like. The configuration module 210 may obtain various parameters from the database 225 such as, for example, previously saved data relating to known or previously input automation system elements or the like. The input or received data may be stored in the database 225 or the like. As will be understood, the database 225 may be distributed across one or several memories and may be accessed via a network or the like.

The configuration module 210 is configured to review the input data to determine the parameters related to configuration of the automation system. The configuration module 210 takes input data, for example, relating to manufacturer, product name/number, functionality, or the like and prepares a configuration of the automation system that will account for communication protocol conversion, latency times, and the like. The configuration module 210 may also allow for further input and adjustments to be made by, for example, a user or users 240. Generally, the configuration module 210 is configured to review the input data and configuration parameters and make adjustments so that the automation stations and conveyor can be in communication and synchronously controlled (i.e. move in a synchronous manner under the control of a master signal) in synchronous zones/areas.

The display/interface 215 provides output information to the end user 240. The processor 220 processes data from the PLC 205 and provides processing power to the configuration module 210 for performing embodiments of the method of managing automation systems described herein. The processor 220 also provides output to the display.

Each of the PLC 205 and the processor 220 may include a master control to provide the master control signal used in synchronous areas. The master control may be in hardware or software (virtual). In this example, the processor 220 includes a virtual software processor master 250. The PLC 205 may also have a PLC virtual master 255, which can be used in the event of external master control (where the master control will 'propagate' a master control signal/information to the processor (more information on this process is describe below with regard to FIGS. 3A, 3B, and 3C), including the state machine/elements involved). In some cases, the PLC will set and control the virtual master in the processor. The PLC will also generally control asynchronous areas and the asynchronous automation stations 105A. In the event of external master control (as described with FIGS. 3A, 3B and 3C) the PLC can control synchronized areas and synchronized automation stations 105B, otherwise the processor can control the synchronized areas and synchronized automation stations 105B. The configuration module 220 may be further enhanced via machine learning, artificial intelligence or the like based on results from previous configurations.

Figure 3A:
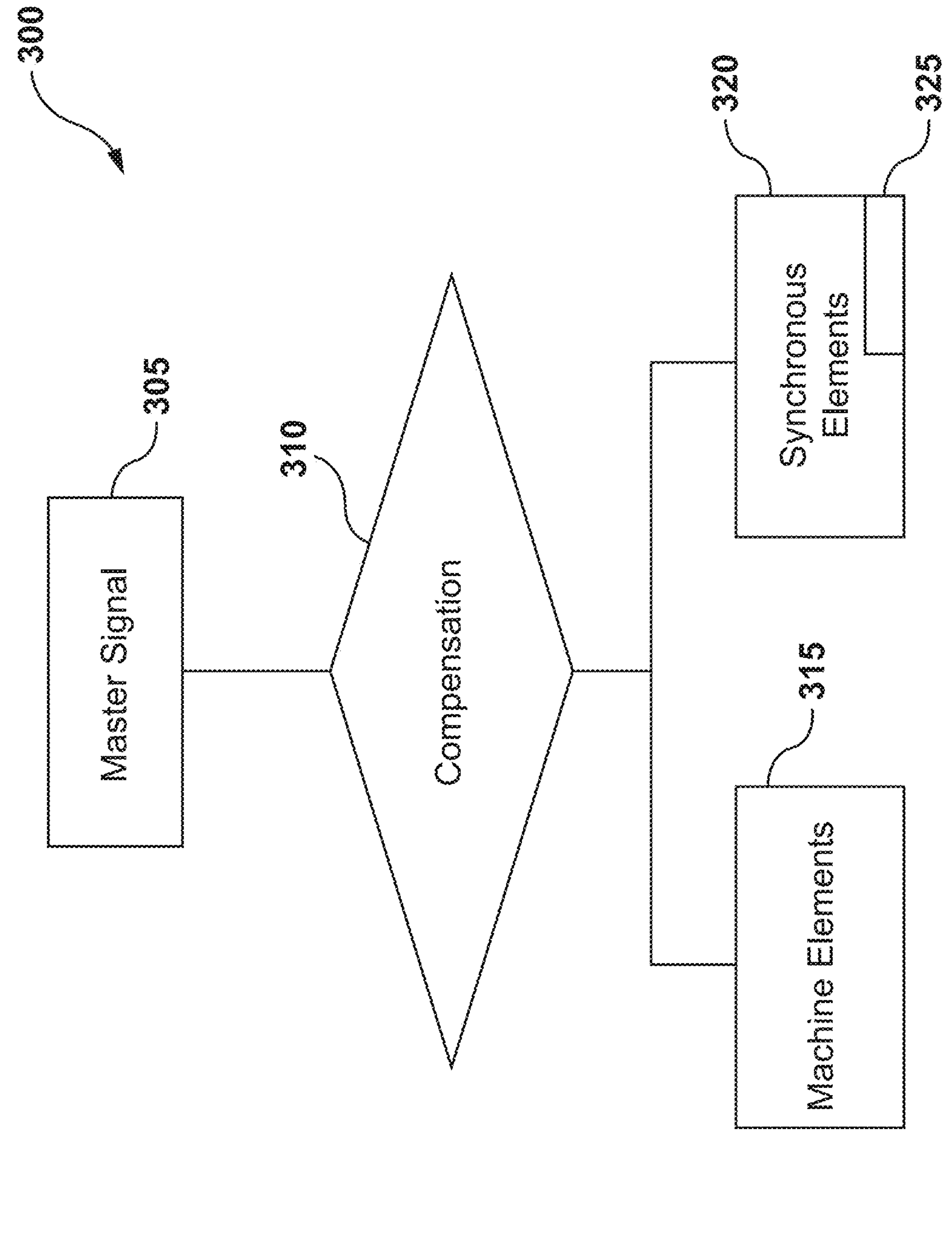
FIG. 3A is a flow chart for a method for managing automation systems according to an embodiment.

FIG. 3A illustrates a method 300 for managing automation systems according to an embodiment. As an example, the method 300 can relate to implementing an external master control signal (for example from a particular manufacturer's PLC or the like) for use when a device with a PLC is synchronized with a conveyor system or the like. In this embodiment, the PLC may control elements that are directly connected to the PLC in some manner, referred to as a "connected element" or "machine element" and may also control an element that may not be directly connected but that is intended to operate synchronously with the connected elements, referred to as a "synchronous element". Connected elements may include servos, switches, mechanical elements and the like. Synchronous elements may include conveyor moving elements (as in this embodiment), other devices having their own PLC or the like.

Figure 11A:
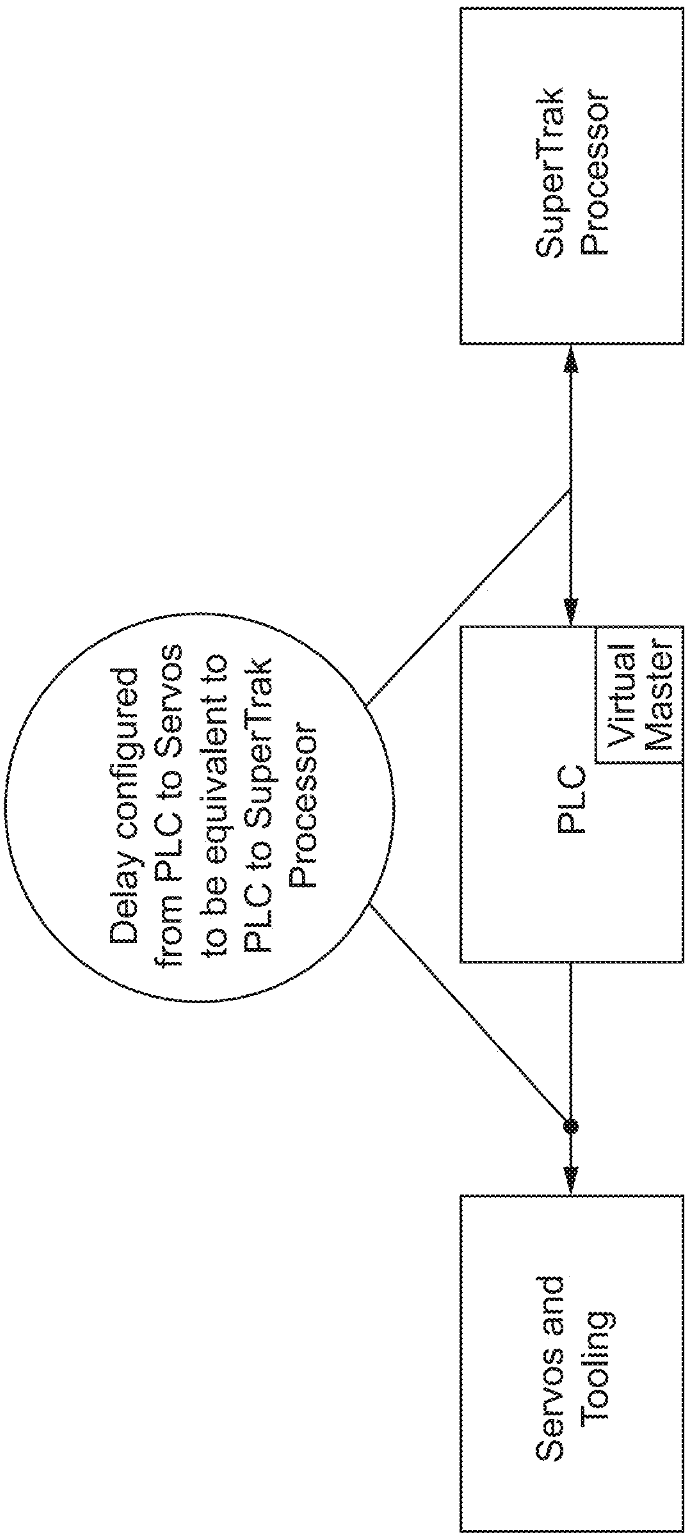
FIG. 11A illustrates an example of the use of an offset of a PLC's command of its servos by a latency delay determined for information transfer to a synchronous element such as a moving element on a conveyor.

Generally, the method 300 includes: send master control information (master signal) from, for example, a PLC to connected elements or over a communication network (an example of typical data/information is shown in FIGS. 9/10) at 305. If necessary at 310, offset the PLC's command of one or both of the connected element, such as servos and the like, and external synchronous elements, such as a conveyor (e.g. SuperTrak™ conveyor) or the like, based on a compensation profile for each connected or synchronous element. As one example, the compensation profile may be related to a latency delay determined based on a time period for information transfer to the connected element and/or the synchronous element that follows the master signal. In this example, the latency delay may vary depending on communication protocol, the characteristics of connected or synchronous element (type of or manufacturer of the equipment), the data being sent, or the like and can be determined by the configuration module in advance. Some example communication protocols include Profinet™ IRT, EtherCAT™, EthernetIP™, and the like). FIG. 11A is an illustration of this approach to handle latency compensation.

After compensation, the compensated master signal is received and processed at each of the connected elements (at 315) and the synchronous elements (at 320) in a synchronous manner. It is noted that the master signal may be a raw signal or may be generated based on a raw signal. It will be understood that directly connected elements may require little or no compensation whereas external synchronous elements may require more detailed compensation. In FIG. 3A, the processing of the raw or generated incoming master signal by the synchronous element can employ compensation algorithms and look-ahead/prediction algorithms at 325 to align real-time with the master signal while filtering out instabilities in the input signal such as those described below and with regard to FIG. 3B. It will be understood that the selection of the master signal from among the devices, conveyors, or the like can be made based on aspects such as, which element controls the most time-sensitive synchronous elements, which device has the ability to support the compensation algorithms, or the like.

Figure 3B:
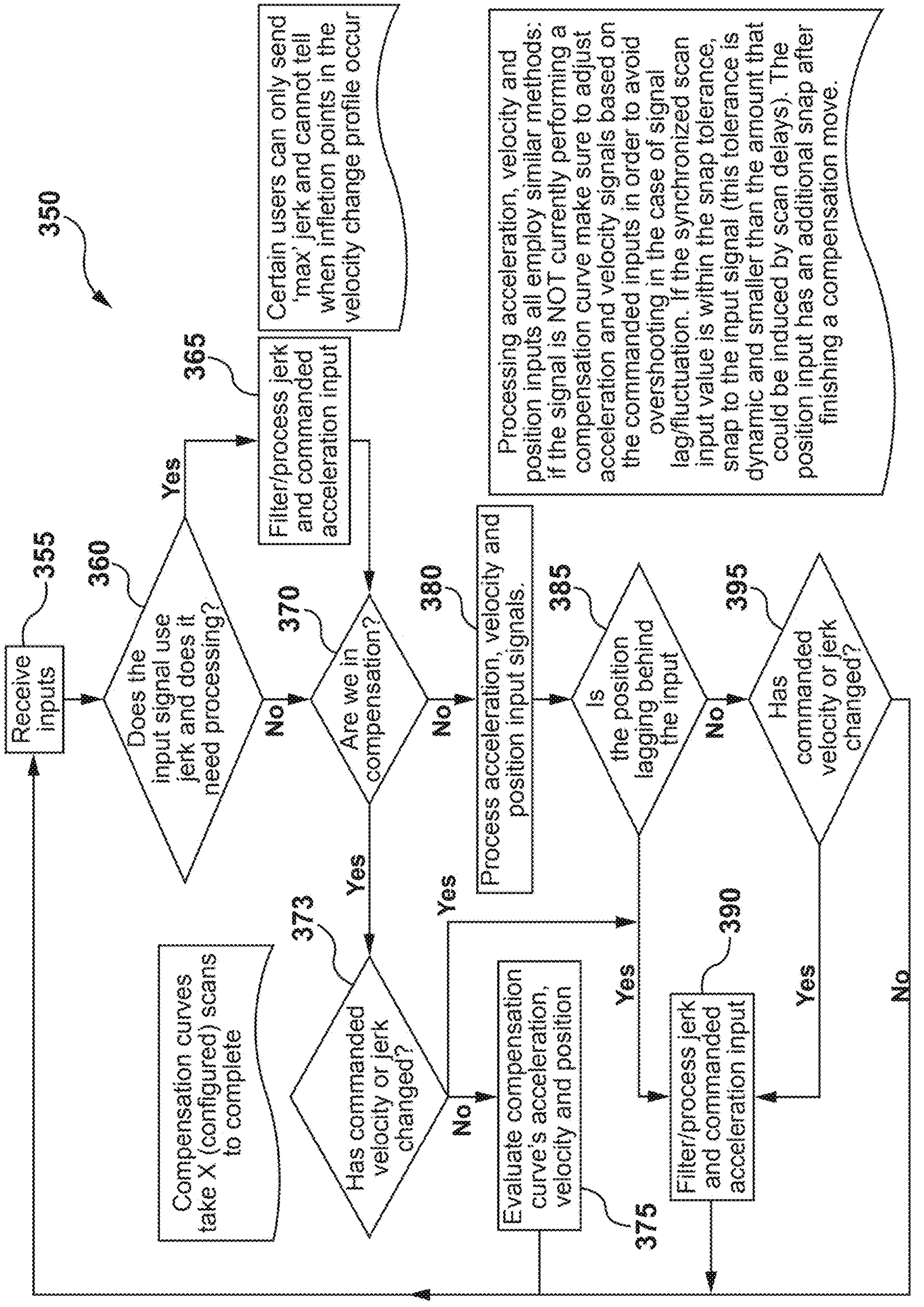
FIG. 3B is a flowchart of an embodiment, for processing an incoming master signal, irrespective of the source.
Figure 3C:
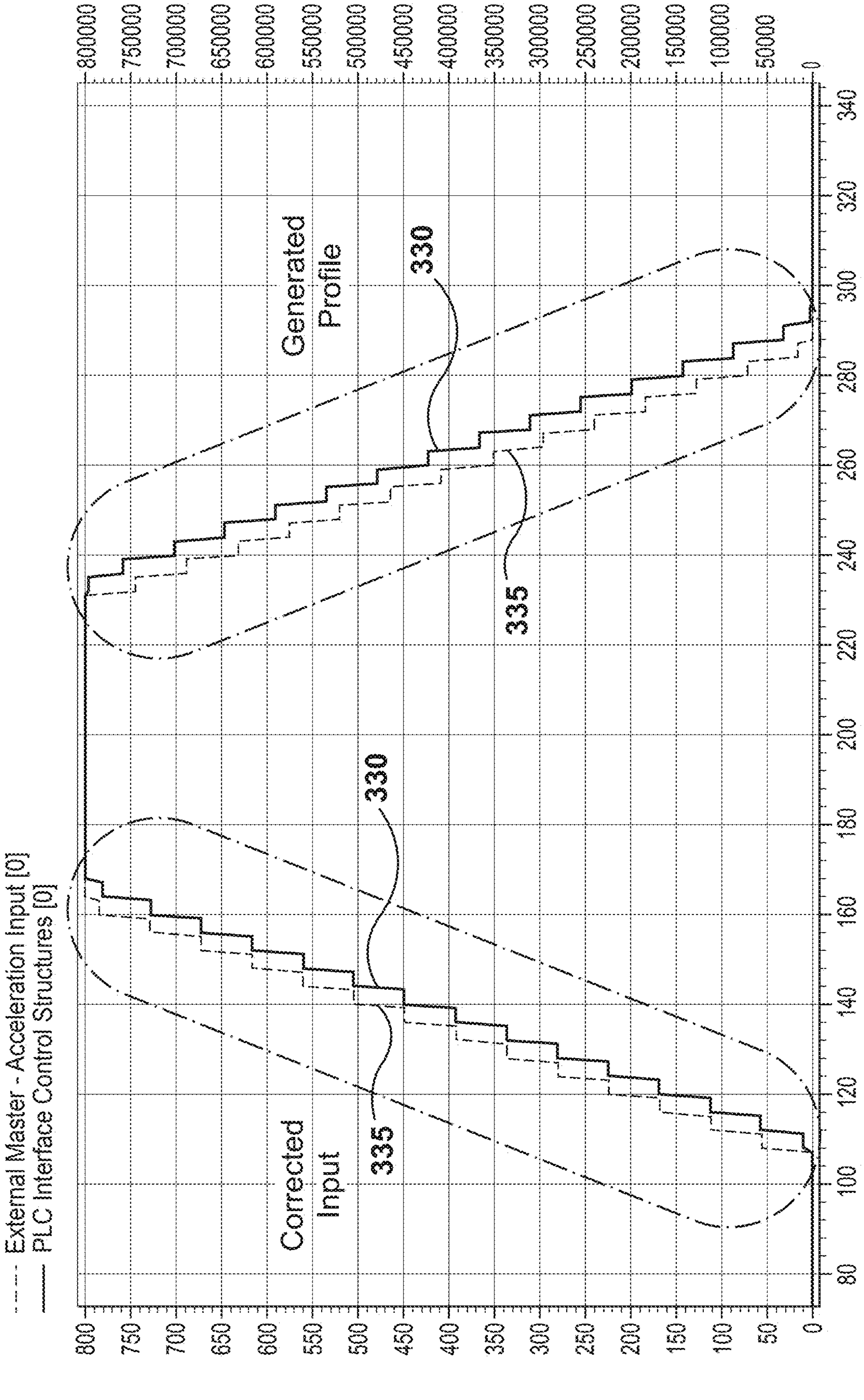
FIG. 3C illustrates a corrected input master signal portion generated by reverse engineering the input master signal's trajectory planner.

FIG. 3B illustrates a flowchart of an embodiment for processing an incoming master signal, irrespective of the source. In some cases, the approach in FIG. 3B is made possible by generating a corrected raw input signal (generated input signal) based on the data received when the source is unable to send data in the format requested. For example, FIG. 3C illustrates a corrected input master signal portion generated by reverse engineering the input master signal's trajectory planner. The blue line (330) shows the input sent from the PLC and the orange line (335) shows the corrected input. Further, in some cases, if the trajectory generation method from the master signal is not exactly known, a generic compensation profile can be used that spans any individual uncertain portions of a master signal's trajectory. This type of generated profile is illustrated for the secondary portion of an acceleration curve in FIG. 3C via the orange line (335). The generation of the master signal can also correct for any error or delay in the input master signal, similar to the corrected input portion. Similar compensation algorithms as in FIG. 3B can then be used to re-align with the generated or corrected input signals, allowing for a genericized compensation implementation. While following a generated master signal, small positional and velocity errors may be induced which can be corrected via a compensation curve once the master signal trajectory has reached a constant velocity.

Figure 11B:
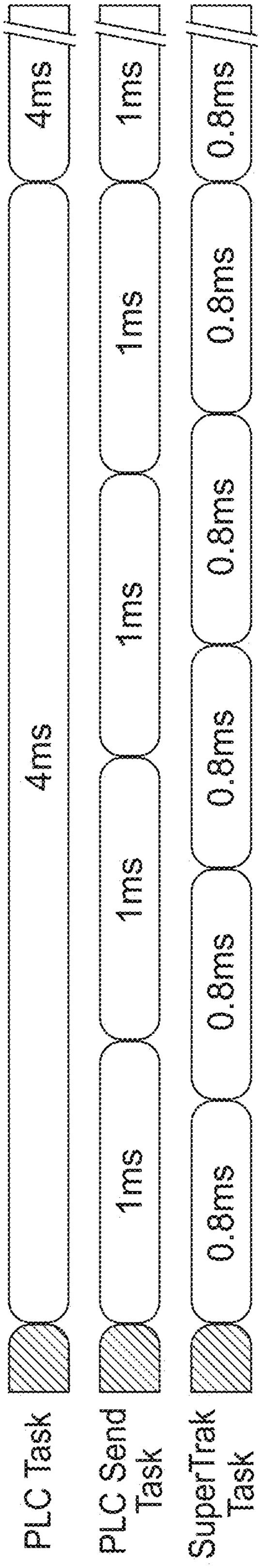
FIG. 11B illustrates one example of timing of a PLC task and a conveyor (SuperTrak) task based on signal time.

In most cases, it is beneficial if the master signal can utilize a predetermined period (such as, for example, 4 ms as illustrated in FIG. 11B) for unique information/data while sending the actual data at another predetermined period (e.g. 1 ms) intervals, that is the same master signal is sent every 1 ms but then updated every 4 ms. The synchronized item (such as a conveyor) can then be configured to process tasks at another time interval (e.g. 800 us). In this way, 4 data points that are the same can be received within the same time as 5 data points from the synchronized element (800 us interval). Generally speaking, the period on the receiving end (synchronized element) can be a divisor of the master signal's period.

Figure 12:
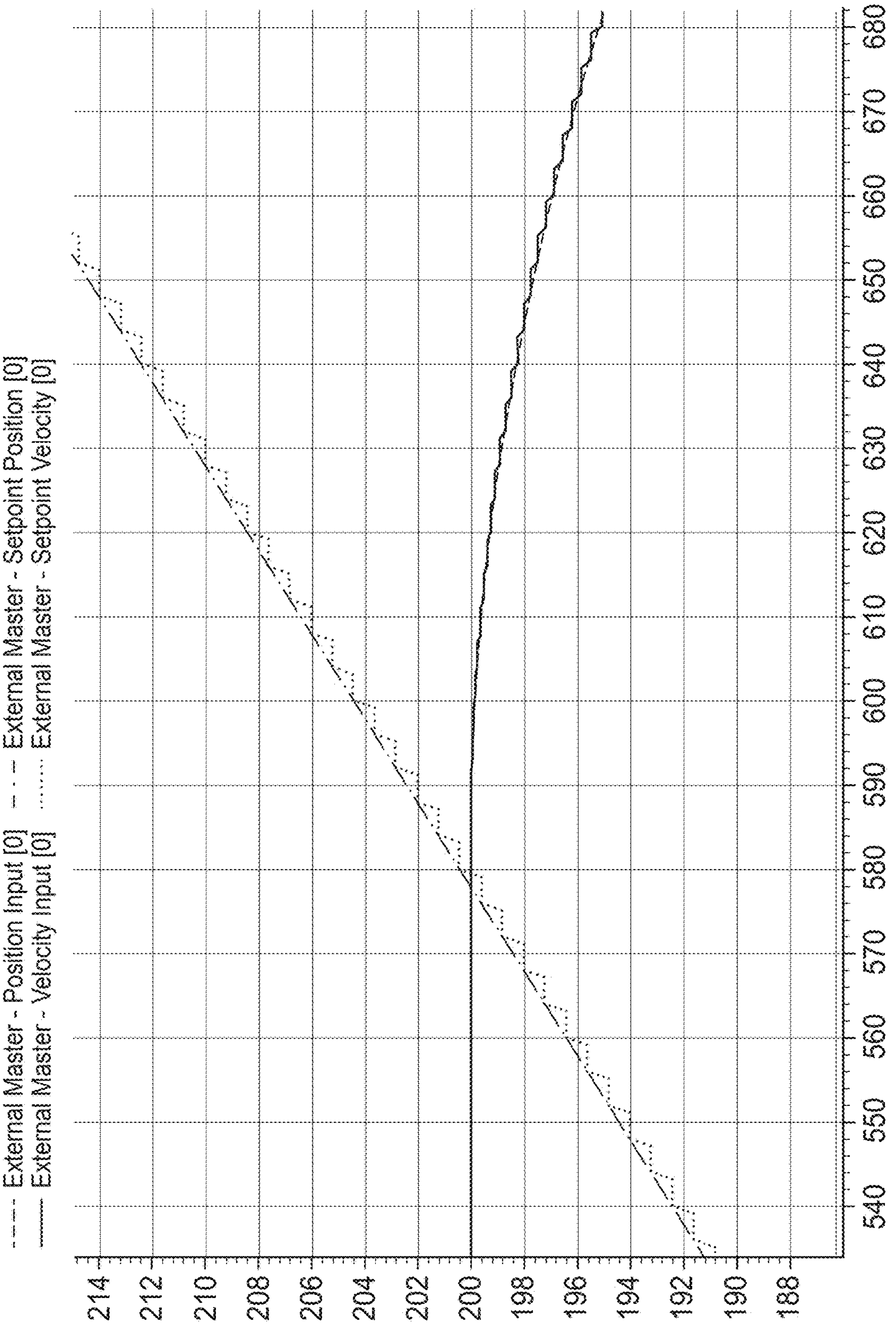
FIG. 12 shows velocity and position setpoints and inputs during the start of a deceleration.
Figure 13A:
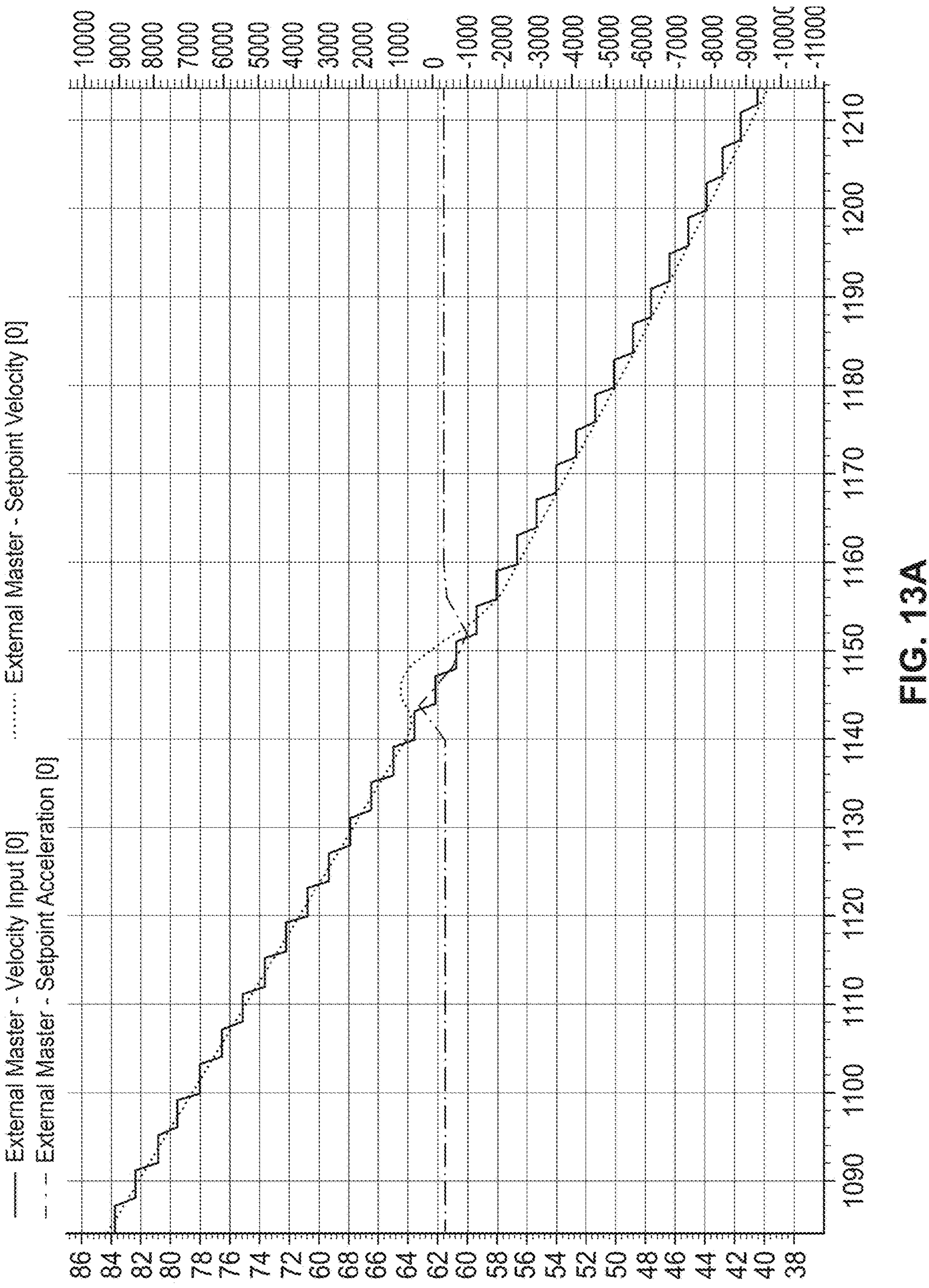
FIG. 13A shows a compensation curve being employed when slight drift is noted in the velocity setpoint vs. input.
Figure 13B:
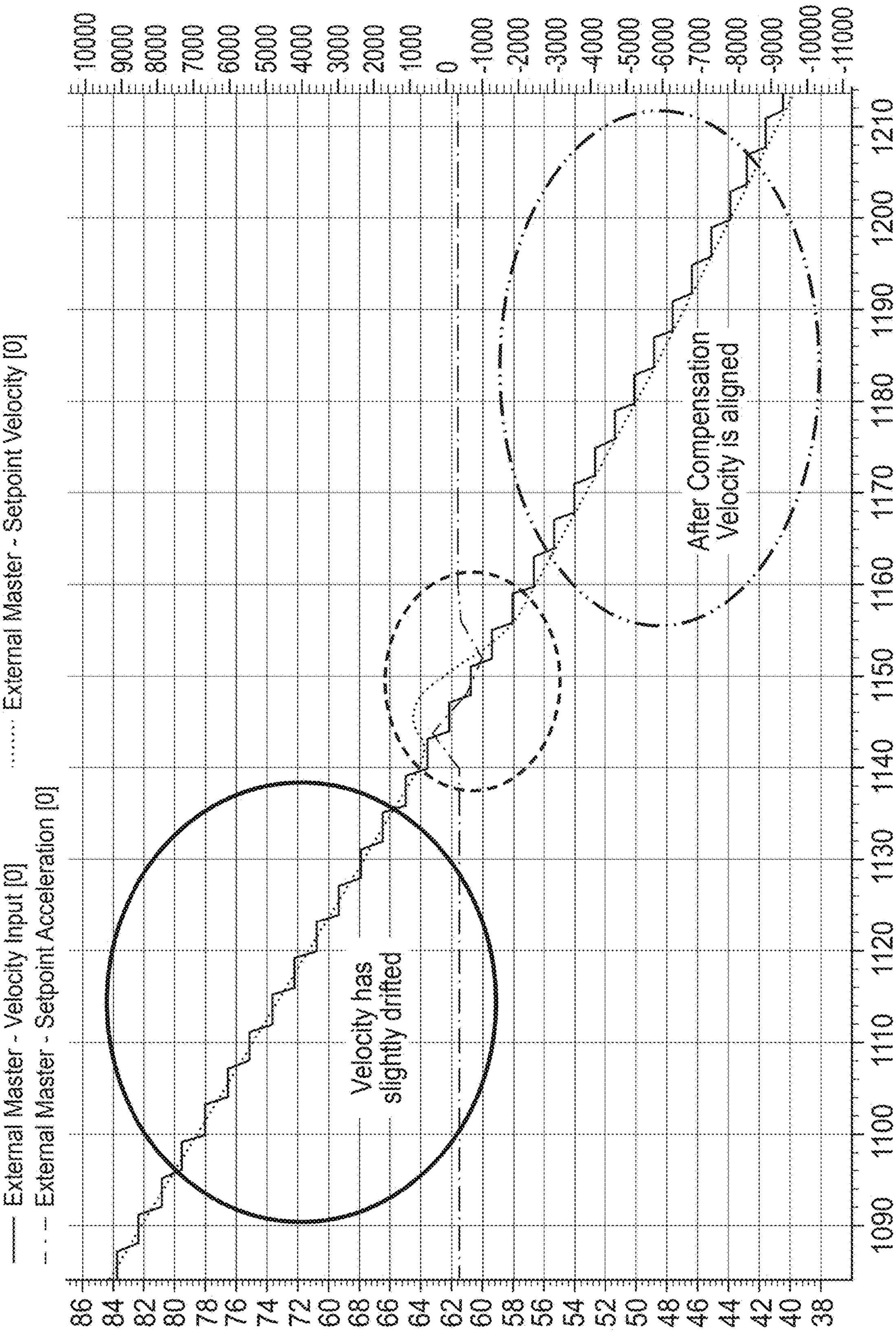
FIG. 13B shows the same curve as FIG. 13A but with labelling to show the drift and compensation areas of the graph.

In some cases, the latency delay used in the method can be determined experimentally by sending and echoing timestamps back and forth from one device to another. By dividing the time stamp difference by 2, the approximate one-way propagation delay can be determined. Typically, the delay can differ on a machine-by-machine basis, depending on the communication protocol method used, length of cable between PLC and machine, and other variables. In some cases, a mathematical relationship among the variables can be determined and kept in a table or the like for lookup, for example, when an alternate supplier device, longer cable, or the like is used as a replacement or the like. Once determined, the latency delay can be used to offset the PLC's commands to connected elements (e.g. servos or the like) that the PLC operates in order to have the connected elements receive inputs from the PLC at approximately the same rate as a synchronized element (e.g. a conveyor or the like) receives a master signal sent from the PLC. In one example, this delay was found to be stable (~0.05 ms of variation) in test applications when using off-the shelf hardware. Using this information, compensation algorithms can be determined for use upon a change in acceleration of the master signal, or if signals began to drift apart due to delays or instability in the network. In one example, where the master signal sends the commanded velocity and acceleration, it is possible to filter or process information that is received at a delay without having to make erroneous adjustments to a calculated master signal position. In this case, if, while traveling at constant velocity, a connected or synchronous element receives a unique master position, but the master position is received one scan late, it is possible to verify that the commanded velocity and acceleration of the system haven't changed, meaning the master signal should have stayed on the path that the master signal was on previously, and then filter the setpoint information based on a predicted/logical next setpoint, checking the setpoint information with any previous setpoints that may have been assigned to the master to see if instability in the signal has occurred. If there is an instability, the instabilities can be filtered out by adapting a methodology of always being slightly behind, or matching in-line, with the master signal. By staying behind the master signal by a value less than the least significant digit of the normally processed signal, it is possible to effectively ignore instabilities such as late erroneous information since the late information would always result in being ahead of the master signal. If this kind of instability occurs, the instability is typically accompanied, at some point, by a correction signal that may be received one scan early, due to the master signal following a periodic send clock, which will cancel the previous delay. In this case, where the commanded velocity and acceleration are also sent, this allows logical predictions to be made and the system can ignore/filter small instabilities in the signal. One of skill will understand that it is also possible to employ the reverse approach of configuring the system to be slightly ahead of the master signal and being able to filter when we receive data early for a scan, which should eventually be accompanied by data that is a scan late. When the commanded velocity or acceleration change; the system can employ a compensation curve. The curve can span a configured number of process scans to correct any 'missed' positional, velocity and acceleration (if using jerk) changes in the X ms the scan was delayed by (in some cases, this is generally 4 ms (PLC servo task cycle time)). A compensation curve can also be employed if there is any drift noted while running (and not covered by an existing compensation). Generally, the system can be configured such that a compensation may only over-write another compensation in the event of a change in commanded velocity or acceleration, or in the event of a change in the jerk-input parameter. FIG. 12 shows velocity and position setpoints and inputs during the start, of a deceleration. FIG. 13A shows a compensation curve being employed when slight drift is noted in the velocity setpoint vs. input. FIG. 13B shows the same curve as FIG. 13A but with labelling to show the drift and compensation areas of the graph. The compensation can be carried through in such a way as to also correct for any positional error, or lack thereof. A system or method using this type of external master implementation may also use jerk as a parameter if the supplying PLC is able to provide it. If jerk is used then a commanded acceleration should also be supplied (since it would be understood that the acceleration is no longer instantaneous).

FIG. 3B illustrates an embodiment of a compensation method 350 of the type that may be used when the master signal is received at the synchronized element. At 355, the system receives or determines input data. At 360, the system determines if the input signal makes use of jerk as a parameter and, if so, if the parameter needs processing. The term jerk refers to the rate at which acceleration is increasing or decreasing and can be important in controlling moving elements, particularly on conveyors. Using jerk as a parameter enables a system to have smooth acceleration and deceleration profiles, and thus improve the accuracy of an external master control implementation. If yes at 360, then at 365, the system filters/processes the jerk and the commanded acceleration input for the virtual master of the processor for, for example, the conveyor.

If no at 360 or upon completion of 365, the system then determines if compensation is needed at 370. If yes at 370, the system checks, at 373, if the commanded velocity or jerk input has changed, and, if yes, the system will jump to setup a new compensation curve at 390. If not, the system evaluates the current compensation curves for acceleration, velocity, position and the like at 375 and then returns to 355 to receive the next inputs. If no at 370 (checking if the system is in compensation), then at 380, the system processes acceleration, velocity and position input signals.

At 385, the system then checks if the position is lagging behind the input (which could mean either ahead or behind in setpoint depending on whether the master is decelerating or accelerating (which is further dependent on the commanded velocity and acceleration). If yes, the system sets up and starts a new compensation curve at 390. If no at 385, the system than checks if the commanded velocity or jerk have changed at 395. If yes, the system moves to set up and start a compensation curve at 390, otherwise, the system returns to receive inputs at 355. In any case where the method proceeds to 390 to setup and start the compensation curve, the method then returns to receive inputs at 355.

Figure 5:
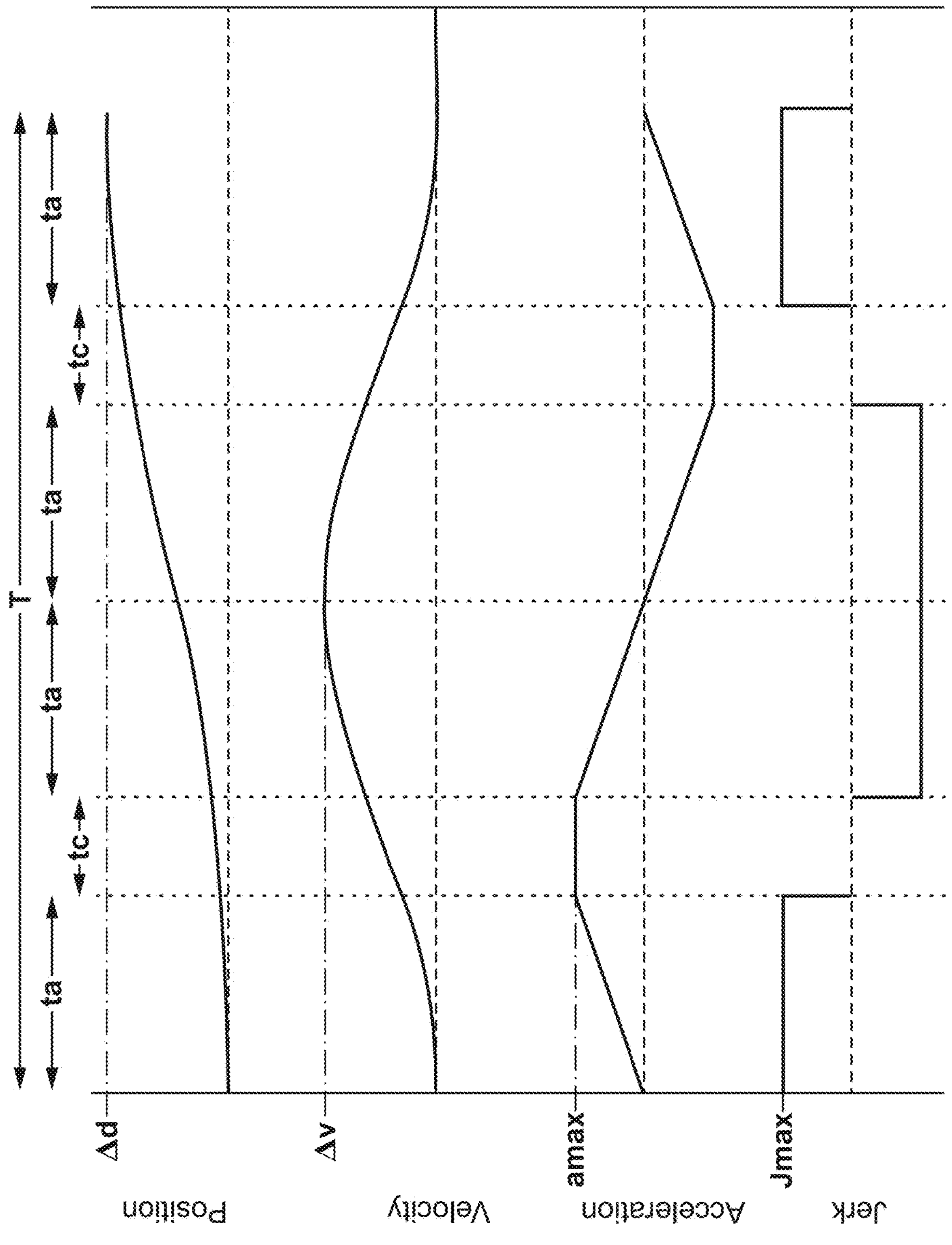
FIG. 5 illustrates a base motion profile diagram for parameters relating to a merge from an asynchronous zone to a synchronous zone.

In the above method, a compensation curve can be set up based on jerk, acceleration, velocity and position changes via curves such as those shown in FIG. 5. For example, to achieve a velocity change, the curve could end at the halfway point shown in FIG. 5. Further details are provided below.

As noted herein, there are additional complexities when a moving element on a conveyor operates in synchronization with an automation station or similar combinations of different equipment that need to have coordinated activity. In the conveyor example given above, a moving element can move between synchronous areas or zones where there is coordinated movement and asynchronous areas or zones where the moving element can be controlled by the conveyor system separately. For synchronous areas that begin with non-zero moving element velocities, an "On-the-Fly" merge needs to be performed when transitioning from an asynchronous to synchronous area to align the moving element to the master signal of the synchronous area. In these cases, the moving element needs to be at the correct location, with the correct velocity at the correct master value in order to synchronize with the master signal.

One of the issues that was found in this synchronization was that not allowing for jerk-controlled motion could result in missed merges, over-currents, excessive power draw, aggressive moving element behavior and other issues. The following description relates to a method for managing an automation system and, more specifically, a method for jerk-controlled compensation intended to merge (transition) a moving element into a sync area in various scenarios while avoiding at least some of the issues identified with conventional systems. Further, the method/algorithm is intended to be executed in an efficient manner on an embedded controller while ensuring a smooth transition between asynchronous and synchronous areas without complex configuration effort required from an end user while reducing or minimizing the size of the transition (merge) area.

FIG. 4 illustrates another method 400 for managing automation systems according to an embodiment. In particular, the method 400 relates to managing movement of a moving element on a conveyor between an area of asynchronous motion and an area of synchronous motion. In this particular example, a moving element is controlled to work with, for example, an automation station in a synchronized manner.

Generally, the method 400 includes: deriving a plurality of jerk-based compensation curves (for example, 4 curves) and combining these over the duration and length of a merging area. The compensation curves can be derived with respect to the moving element's and automation station's immediate motion characteristics to provide for a smooth transition. The compensation curves are initially derived with respect to time. The combined curve is executed with respect to a master signal (for example, the automation station's signal) in order to cover the case of the master signal switching its velocity during the merge. The method 400 and the use of compensation curves are intended to allow for cases where the moving element is late or early including those where the moving element needs to stop to properly align the timing of the merge.

As shown in FIG. 4, the method 400 begins when a moving element (sometimes referred to as a "pallet") enters the merge zone at 405. The system then determines the time remaining to enter the sync area/zone at 410. The time remaining can be determined, for example, by assuming the master begins to accelerate to maximum velocity immediately, calculating the lowest possible amount of time for the current merge. The system then determines if the pallet is accelerating at 415. If yes, then the system determines, at 420, an abort for the current acceleration based on a resulting final velocity/position after the abort. If not at 415 or after 420, the system determines the next possible index for alignment at 425.

At 430, the system determines if the pallet should stop. The calculation to determine if the pallet should stop can be based on various factors such as: a calculation of the extremes of the velocity compensation profile, noting if the velocity either dips below the 0 point, above the max velocity or finally if the change in velocity is larger than the one attainable based on acceleration, jerk parameters, and the like. If yes, at 435, the system will stop the pallet at the calculated minimum stopping position and determine the next possible index and when to start moving at 440.

If no at 430 or after 440, the system then determines the velocity compensation profile needed at 445. The system also determines the position compensation profile needed at 450. The compensation curves are determined in a way that is intended to ensure no moving element collisions can occur with the moving element in front. The compensation functions by aligning the moving element to the backwards propagated entry-constant velocity curve. The moving element is aligned to both the velocity and the position simultaneously over the course of the merge. By aligning the moving element with the entry curve, the system/method is intended to ensure no collisions with moving elements in front of it that could be following this entry curve. By examining FIGS. 6 and 7, which illustrate compensation curves, one can see that the Pallet Merge Position curve never crosses the Straight Line Entry Move Position Curve (the top left plots in each figure). At 455, the method/system logs base movement characteristics of the master signal that were used to calculate the compensation profiles for velocity and position. The method/system then later uses these characteristics to execute the profile with respect to master degrees, instead of time.

At 460, the system calculates additive jerk to be applied to the pallet based on compensation profiles. The system then determines if the master position change is different from the base logged at 465. If yes, the system interpolates jerk based on base movement characteristics at 470. If no or following 470, the system applies the jerk value to the pallet at 475. The system then checks if the merge is complete at 480. If not, the method returns to calculate additive jerk at 460. If yes, the method ends at 485.

FIG. 5 illustrates a sample compensation curve in relation to position, velocity, acceleration and jerk. The compensation curves can be used as noted above and during a merge operation from asynchronous to synchronous areas/zones. Based on the plots in FIG. 5, the following equations can be determined:

$$T=4*t_a+2*t_c \quad (1)$$

$$a_{max}=J_{max}*t_a \quad (2)$$

$$\Delta v=(2*t_a*a_{max})/2+t_c*a_{max}=(t_a+t_c)*a_{max} \quad (3)$$

$$\Delta d=(4*t_a+2*t_c)*v_{max}/2=(2*t_a+t_c)*v_{max} \quad (4)$$

In these equations, the knowns are T, $a_{max}$, and Δd and the unknowns are $t_a$, $t_c$, and $J_{max}$. From (1) we can derive:

$$t_a=T-2*t_c/4 \quad (5)$$

From (3) and (4), we can derive:

$$\Delta d=(2*t_a+t_c)*(t_a+t_c)*a_{max}=(2*t_a^2+3*t_a*t_c+t_c^2)*a_{max} \quad (6)$$

From (6) and (2), we can derive:

$$J_{max}=a_{max}/t_a=\Delta d/(2*t_a^3+3*t_a^2*t_c+t_a*t_c^2) \quad (7)$$

Plugging (5) into (6), simplifying, and solving for $t_c$ gives us:

$$t_c=4*\Delta d/(a_{max}*T)-T/2 \quad (8)$$

This equation (8) has all knowns, so we can solve for $t_c$ and plug back into (5) to get $t_a$, which we can then plug back into (7) to get $J_{max}$.

Figure 6:
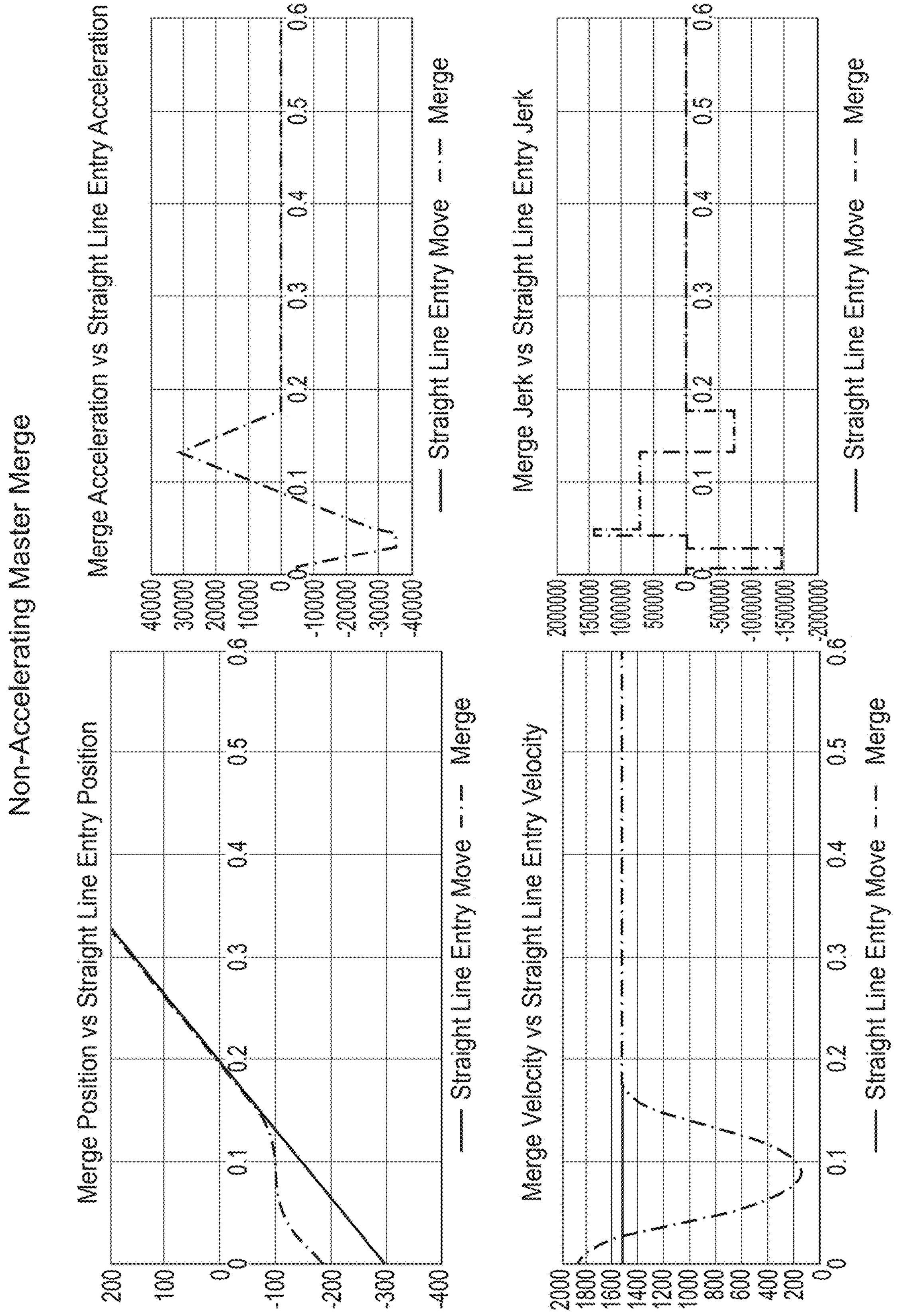
FIG. 6 illustrates an ideal alignment of a pallet to an entry profile velocity merge using an embodiment of the system and method herein.
Figure 14:
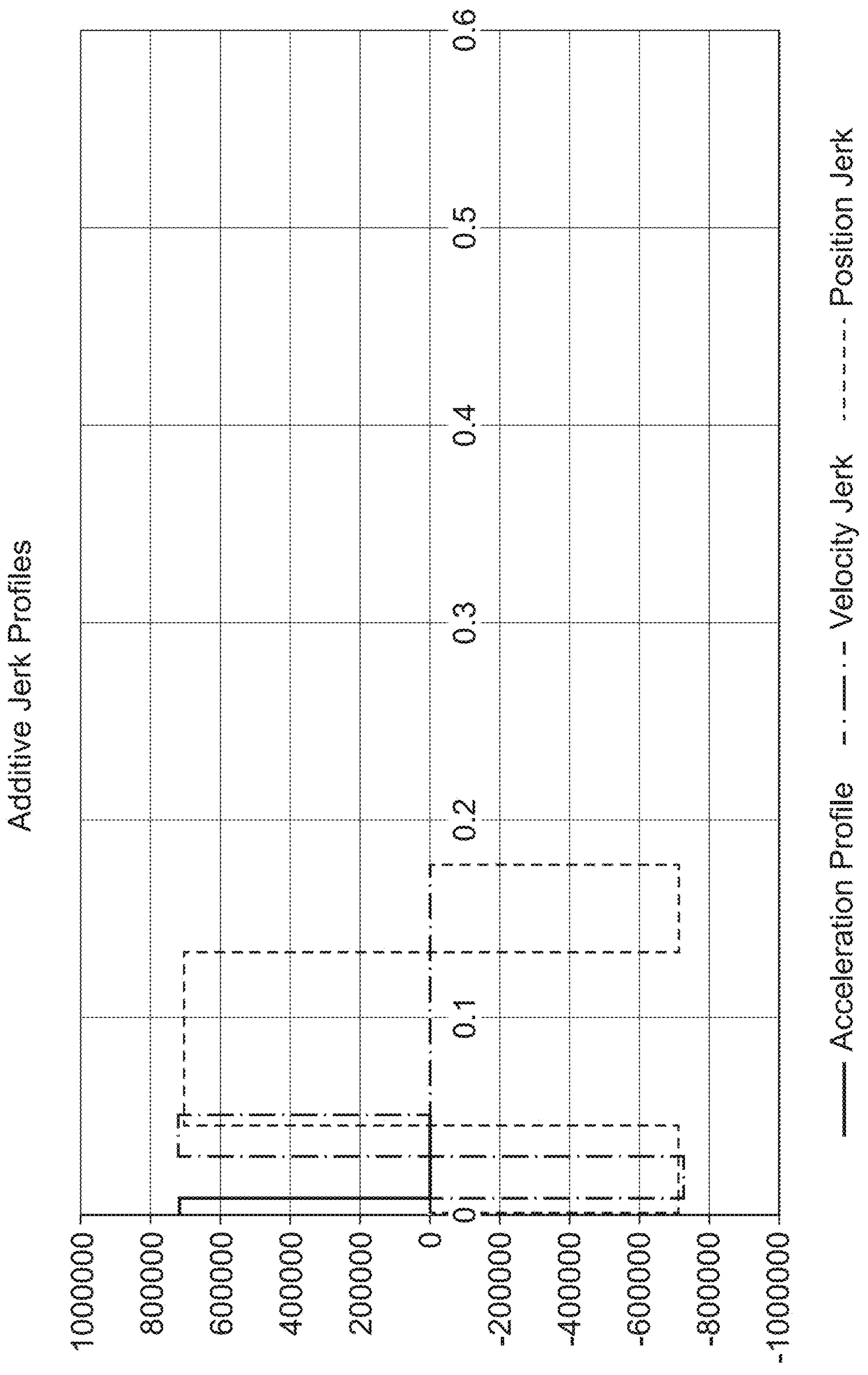
FIG. 14 shows the additive jerk profiles separately (calculated for the acceleration, velocity and position compensation curves)

These equations can be used to determine position compensation curves with respect to jerk and time. It is noted that upon completion of the curves above, the only overall change can be a change in position, and by organizing the curves as shown in FIG. 5, it is possible to simplify their calculation, which can be beneficial to run this method/system on an embedded controller (typically having limited memory and/or processing power). This solution helps to overcome previous issues of using jerk-controlled motion, such as the solving and processing of cubic polynomials. Using jerk controlled motion profiling can help to reduce power draw spikes and reduce wear on moving element components. Overall, the methodology stated above allows the use of jerk in, for example, a "maximum jerk allowed" configuration, without compromising performance and risking cycle-time violations or the like. As seen in FIG. 5, velocity and acceleration compensations look the same and can be cut off at the half-way and quarter way points, respectively. The curves are generally calculated in order: acceleration, velocity and lastly position, using the current time left to merge at the time of calculation. This is done since the acceleration curve will produce a change in both velocity and position, and the velocity curve will produce a change in position that need to be accounted for when figuring out the curves needed to align the moving element to the entry motion profile. The time left to merge can be based on the current (instantaneous) velocity and position of the master. It is noted that these parameters/compensation curves generally function best in an "ideal case" where the master signal does not change velocities. FIG. 6 illustrates a comparison between a straight-line entry and a pallet merge using an embodiment of the system and method herein. FIG. 6 illustrates an "ideal case" in showing the additive overall compensation profile executed in the case where a master signal does not change velocity in the merge (as noted by the straight-line entry velocity blue curve being constant). The acceleration curve is executed at the start of the merge, and after it is complete the velocity curve is executed. The position compensation curve is executed throughout the entire merge since it does not affect overall velocity or acceleration change. FIG. 14 shows the additive jerk profiles separately (calculated for the acceleration, velocity and position compensation curves). The rest of the curves can be integrated from the additive jerk curve.

Figure 7:
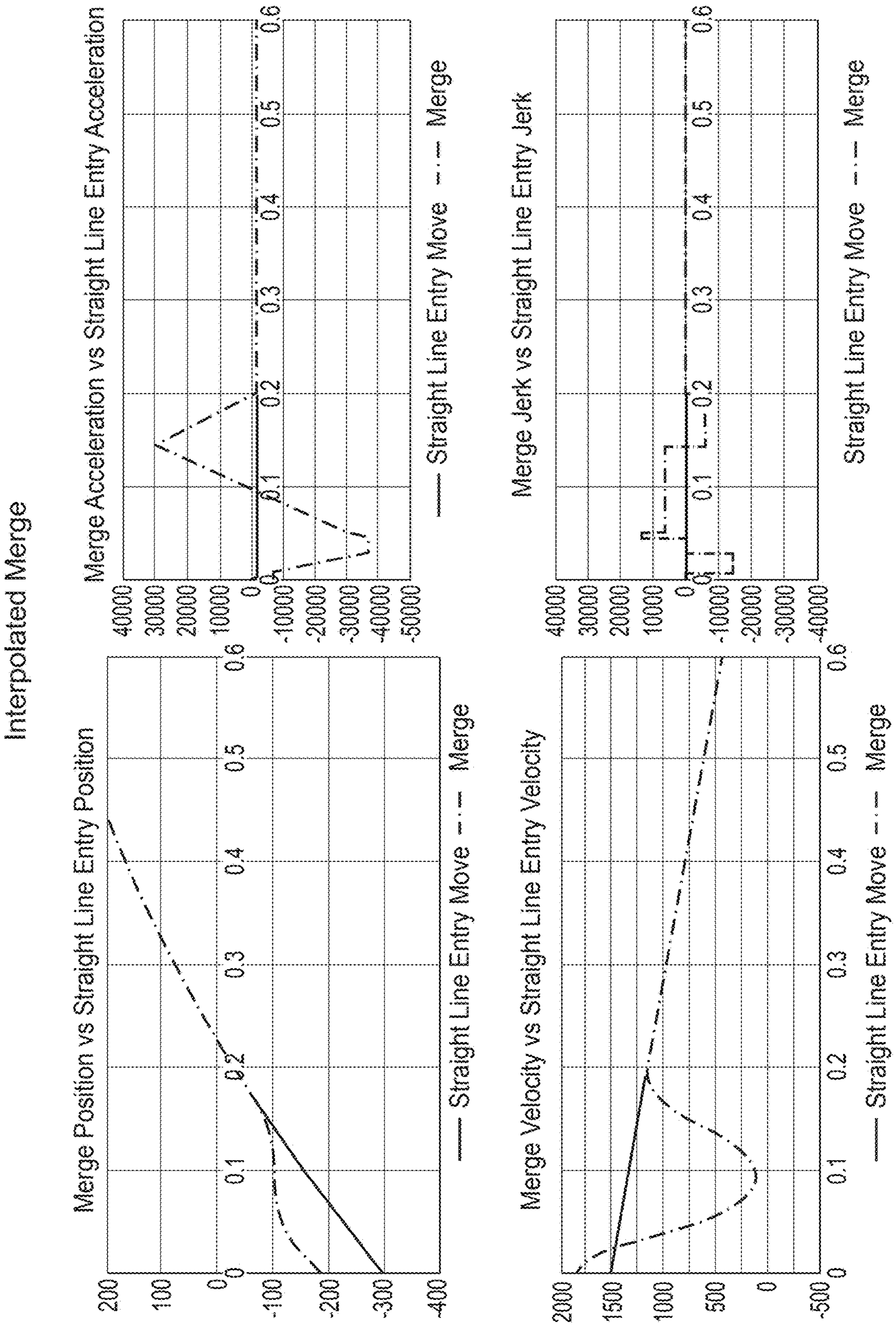
FIG. 7 illustrates a practical alignment of a pallet to an entry profile velocity merge, respecting a changing master's profile using an embodiment of the system and method herein.

To address a more general case, for example, involving a velocity change in the merge, the 'ideal' calculated compensation profile can be executed with respect to degrees traveled by the master signal instead of with respect to time. This allows the method/system to 'stay in sync' with the master signal, accounting for slow downs, speed ups, or even stops of the master signal mid compensation profile-execution. The interpolated execution with respect to master signal degrees instead of time is done by advancing the ideal compensation profile and then interpolating between 2 sets of discrete points (for example, discretized by an 800 us controller cycle) with respect to the ratio of how much the master has advanced in the current scan versus how much it would have advanced based on the initial characteristics logged earlier. FIG. 7 shows the same type of 'ideal' case shown in FIG. 6 but executed with respect to a velocity changing (decelerating) master signal. Note that the straight-line entry velocity does not stay the same throughout the merge and gradually changes. In FIG. 7, it can be seen that, based on the time x-axis, that the merge completes later on (crosses the 0 position y-axis). In some cases, in working with time-based compensation, an additive jerk can be added to the entire compensation profile any time the master experiences acceleration/deceleration. The additive jerk can be, for example, scaled based on the maximum merge velocity to maximum master velocity relationship.

Figure 15:
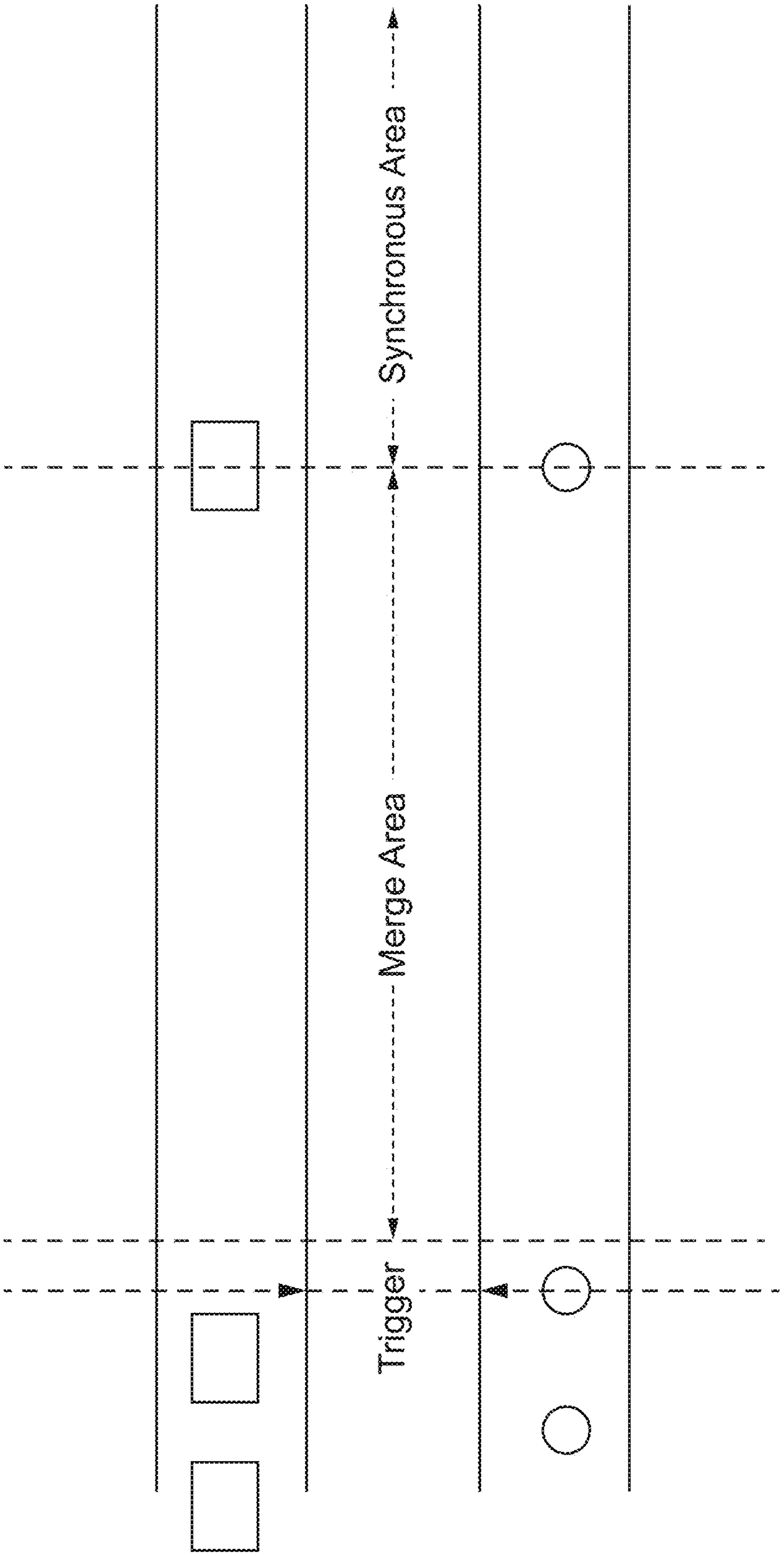
FIG. 15 illustrates the use of a master signal and compensation between two conveyors providing a synchronous area.

By deriving the merging compensation curves with respect to time remaining to complete a merge at the moment of derivation, the act of merging can be de-coupled as being a static curve with respect to the master position. Because of this, it is possible to use the implementation to enable variable merging, where it is possible to assign an arbitrary degree value at which point the pallet should be synchronized moving at a designated velocity at the start of the synchronous area. Coupled with the external master implementation explained above, the variable merging technique allows for synchronization with other types of conveyors, such as belt conveyors, which generally have variable pitched and constant velocity. As illustrated in FIG. 15, a first conveyor is provided with pallets and a second conveyor is provided with workpieces with the goal of synchronizing the workpieces with the pallets so that, for example, workpieces can be placed on a pallet. In this case, the first conveyor is a linear motor conveyor with independently controlled pallets and the second conveyor is a belt conveyor with variable pitch and approximately constant speed, however, it will be understood that the first and second conveyors may also be the same type of conveyor. A synchronization operation includes receiving an input signal (trigger signal) from a PLC as a workpiece on the second conveyor is entering a merging, or staging, area prior to a synchronous area. The trigger signal is used to determine the master signal degrees or time prior to the workpiece reaching the synchronous area. A controller can then synchronize or merge an incoming pallet to align with the workpiece at the start of the synchronous area by setting a custom merge time and degree value. Since the movement profile of the pallet is executed with respect to master signal degrees, any slow down in the second conveyor's master signal will also translate to the first conveyor/pallet, ensuring that synchronization is achieved upon entering the synchronous area, after crossing the merging area. The pallet and workpiece can then travel synchronously at constant velocity, while maintaining relative position.

As illustrated in FIG. 15, the master signal approach with compensation can also be used to synchronize conveyor to conveyor for various operations where two conveyors may need to be synchronized. In some cases, if the conveyors are of the same type and same manufacturer, or the like, any compensation required may not be as significant and could be set accordingly. Similarly, the jerk compensation approach can be used in various applications to synchronize various elements of an automation system. Although the master signal approach and the jerk compensation approach have been described together herein, one of skill in the art will understand that each approach may be used separately as well and that portions of each approach may be used with the other as appropriate for particular applications.

In the preceding description, for purposes of explanation, numerous details are set forth in order to provide a thorough understanding of the embodiments herein. However, it will be apparent to one skilled in the art that these specific details may not be required. In other instances, well-known structures or circuits may be shown in block diagram form in order not to obscure the overall system or method. For example, specific details are not provided as to whether the embodiments described herein are implemented as a software routine, hardware circuit, firmware, or a combination thereof.

In the preceding description, for purposes of explanation, numerous details are set forth in order to provide a thorough understanding of the embodiments herein. However, it will be apparent to one skilled in the art that these specific details may not be required. In other instances, well-known structures or circuits may be shown in block diagram form in order not to obscure the overall system or method. For example, specific details are not provided as to whether the embodiments described herein are implemented as a software routine, hardware circuit, firmware, or a combination thereof.

Embodiments can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment. Those of ordinary skill in the art will appreciate that other instructions and operations necessary to implement the described embodiments can also be stored on the machine-readable medium. Software running from the machine-readable medium can interface with circuitry to perform the described tasks.

The above-described embodiments are intended to be examples only. Elements of one embodiment may be used with other embodiments and not all elements may be required in each embodiment. Alterations, modifications and variations can be effected to the particular embodiments by those of skill in the art without departing from the scope of the invention, which is defined solely by the claims appended hereto.

What is claimed is:

1. A method for managing an automation system involving a plurality of synchronous elements, the method comprising:

designating a master signal comprising new control data, the master signal having a predetermined period, the master signal for controlling the plurality of synchronous elements;

communicating the master signal to the plurality of synchronous elements using a communication protocol at a sending interval that is less than the predetermined period, each of the plurality of synchronized elements processes control data at a task period that is a divisor of the predetermined period, wherein each synchronized element makes logical predictions based on the master signal and ignores or filters instabilities in the master signal received at the synchronous elements;

determining a compensation profile for each of the plurality of synchronous elements based on the communication protocol and characteristics of each of the plurality of synchronous elements; and utilizing the compensation profile and the master signal in the control of the automation system.

2. A method according to claim 1, wherein the compensation profile comprises a lag time between the sending of the master signal and the receipt of the master signal at each synchronous element.

3. A method according to claim 1, wherein the compensation profile is also based on characteristics of the data being sent.

4. A method according to claim 1, wherein the compensation profile comprises compensation based on at least one of commanded position, commanded velocity, and commanded acceleration.

5. A method according to claim 4, wherein the compensation profile comprises compensation for jerk.

6. A method according to claim 1, wherein the compensation profile comprises predetermined compensation graphs to reduce computation time and complexity.

7. A method according to claim 1, wherein the master period, the sending period, and the task period are three distinct periods, with the task period being shorter than the sending period and the sending period being shorter than the master period, such that the same new control data of the master signal is transmitted multiple times within the master period and received multiple times by each synchronized element within the master period.

8. A method according to claim 7, wherein the redundancy provided by the sending period being less than the master period and the task period being a divisor of the master period enables each synchronized element to make a logical prediction of a next setpoint from one or more previously received instances of the master signal and to ignore or filter a received instance of the master signal that is inconsistent with the prediction.

9. A system for managing an automation system involving at least two synchronous elements, the system comprising:

a first controller for controlling a first of the synchronous elements; a second controller for controlling at least a second of the synchronous elements;

a configuration module for configuring at least the second synchronous element; a memory storing instructions that, when executed by the first controller and second controller, cause the first controller and second controller to:

designate the first controller as a provider of a master signal comprising new control data, the master signal having a predetermined period, the master signal for controlling the at least two synchronous elements;

communicate the master signal to the at least two synchronous elements using a communication protocol at a sending interval that is less than the predetermined period, each of the at least two synchronized elements processes control data at a task period that is a divisor of the predetermined period, wherein each synchronized element makes logical predictions based on the master signal and ignores or filters instabilities in the master signal received at the second synchronous element;

determine a compensation profile for each of the at least two synchronous elements based on the communication protocol and characteristics of each of the at least two synchronous elements; and utilize the compensation profile and the master signal in the control of the automation system.

10. A system according to claim 9, wherein the compensation profile comprises a lag time between the sending of the master signal and the receipt of the master signal at each synchronous element.

11. A system according to claim 9, wherein the compensation profile is also based on characteristics of the data being sent.

12. A system according to claim 9, wherein the compensation profile comprises compensation based on at least one of commanded position, commanded velocity, and commanded acceleration.

13. A system according to claim 12, wherein the compensation profile comprises compensation for jerk.

14. A system according to claim 9, wherein the compensation profile comprises predetermined compensation graphs to reduce computation time and complexity.

15. A system according to claim 9, wherein the configuration module provides data to the second controller regarding communication protocols and compensation profiles.

16. A system according to claim 9, wherein the master period, the sending period, and the task period are three distinct periods, with the task period being shorter than the sending period and the sending period being shorter than the master period, such that the same new control data of the master signal is transmitted multiple times within the master period and received multiple times by the second synchronous element within the master period.

17. A system according to claim 16, wherein the redundancy provided by the sending period being less than the master period and the task period being a divisor of the master period enables the second controller to make a logical prediction of a next setpoint from one or more previously received instances of the master signal and to ignore or filter a received instance of the master signal that is inconsistent with the prediction.

* * * * *